United States Patent

Luciani

[19]

[11] Patent Number: 6,062,504
[45] Date of Patent: May 16, 2000

[54] WIRE WINDING GUIDE

[75] Inventor: Sabatino Luciani, Florence, Italy

[73] Assignee: Axis USA, Inc., Tampa, Fla.

[21] Appl. No.: 08/910,480

[22] Filed: Jul. 25, 1997

Related U.S. Application Data

[60] Provisional application No. 60/023,499, Aug. 7, 1996.

[51] Int. Cl.[7] .................................................. H02K 15/09
[52] U.S. Cl. ............................................. 242/433.4; 29/605
[58] Field of Search .............................. 242/433.4, 432.6; 29/596

[56] References Cited

U.S. PATENT DOCUMENTS

| | | | |
|---|---|---|---|
| 2,535,438 | 12/1950 | McCollom | 242/433.4 |
| 3,713,598 | 1/1973 | Bucholtz et al. | 242/433.4 X |
| 3,924,816 | 12/1975 | Schubert et al. | 242/433.4 X |
| 4,262,853 | 4/1981 | Dammar | 242/433.4 X |
| 4,335,856 | 6/1982 | Fuzita | 242/433.4 X |
| 4,340,186 | 7/1982 | Shimada et al. | 242/433.4 X |
| 4,520,965 | 6/1985 | Kimura et al. | 242/433.4 X |
| 4,765,551 | 8/1988 | Page et al. | 242/433.4 |
| 5,064,128 | 11/1991 | Iwase | 242/433.4 |
| 5,794,884 | 8/1998 | Dolgas et al. | 242/433.4 X |

FOREIGN PATENT DOCUMENTS

| | | | |
|---|---|---|---|
| 191195 | 8/1986 | European Pat. Off. | 29/596 |
| 1 015 912 | 9/1957 | Germany . | |
| 1015912 | 9/1957 | Germany . | |
| 52-071603 | 6/1977 | Japan . | |
| 359072966 | 4/1984 | Japan | 242/433.4 |
| 59-72966 | 4/1984 | Japan . | |
| 361054850 | 3/1986 | Japan | 242/432.6 |
| 63-257440 | 10/1988 | Japan . | |
| 07147756 | 6/1995 | Japan . | |
| 1495937 | 7/1989 | U.S.S.R. | 242/433.4 |

*Primary Examiner*—Donald P. Walsh
*Assistant Examiner*—Emmanuel M. Marcelo
*Attorney, Agent, or Firm*—Fish & Neave; G. Victor Treyz; Edward M. Arons

[57] ABSTRACT

A wire guide for winding wire onto the ferromagnetic core of a dynamo-electric machine part to form wire coils in the slots of the core. The wire guide has guide surfaces that allow wire to be wound deeply into the slots of the core. The wire guide also has a pair of coil retention notches. The notches have back walls that prevent wire from climbing along the sides of the slots toward the slot openings during the process of coil winding.

14 Claims, 6 Drawing Sheets

WIRE WINDING GUIDE

This application claims the benefit of U. S. provisional application No. 60/023,499, filed Aug. 7, 1996.

BACKGROUND OF THE INVENTION

The present application concerns winding wire coils into the slots of a ferromagnetic core of a stator or of an armature for a dynamo-electric machine such as an electric motor, a generator, an alternator, or the like.

Wire winding machines are used to wind wire onto the ferromagnetic cores of dynamo-electric machine parts, such as armatures and stators. The cores have slots into which wire must be wound to form wire coils. In operation of these parts, current is passed through the coils.

To form the coils, wire is dispensed from a rotating arm called a flyer. The flyer rotates about the core repeatedly, depositing wire turns to form complete coils. A winding guide is used to guide the wire as it is dispensed from the flyer and wound into the core slots to form the coils.

In a core such as an armature core, slots extend longitudinally along the core and are evenly distributed about the circumference of the core. Coils are formed by winding wire into certain pairs of slots. Some cores have numerous slots and require several circumferential layers of coils. With such cores, the depths of the slots can be considerable and the pairs of slots into which the coils are wound can be spaced fairly close to one another (i.e., the angular separation between the slots in the pair is small). As a result, it is often difficult to wind wire deeply into the slots. In addition, the small angular separation of the slots causes the sides of the slots to be nearly parallel to each other. Because the sides are nearly parallel, there is a tendency for the wire to climb out of the slots, which may hinder the regular and orderly placement of the various layers of coils and may leave the bottom of the slots with fewer coil turns than desired.

It is therefore an object of the present invention to provide an improved technique for winding wire into the slots of a ferromagnetic core for a dynamo-electric machine part.

SUMMARY OF THE INVENTION

This and other objects of the invention are accomplished in accordance with the principles of the present invention by providing a wire guide for guiding wire into the slots of the ferromagnetic core of a dynamo-electric machine part such as an armature or stator. The wire guide allows wire to be wound deeply into the slots while preventing the wire from climbing the sides of the slots. In particular, the wire guide has smooth outer guide surfaces that deposit wire deeply in the slots. The wire guide also has coil retention notches that prevent wire from climbing the side walls of the slots during coil winding.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
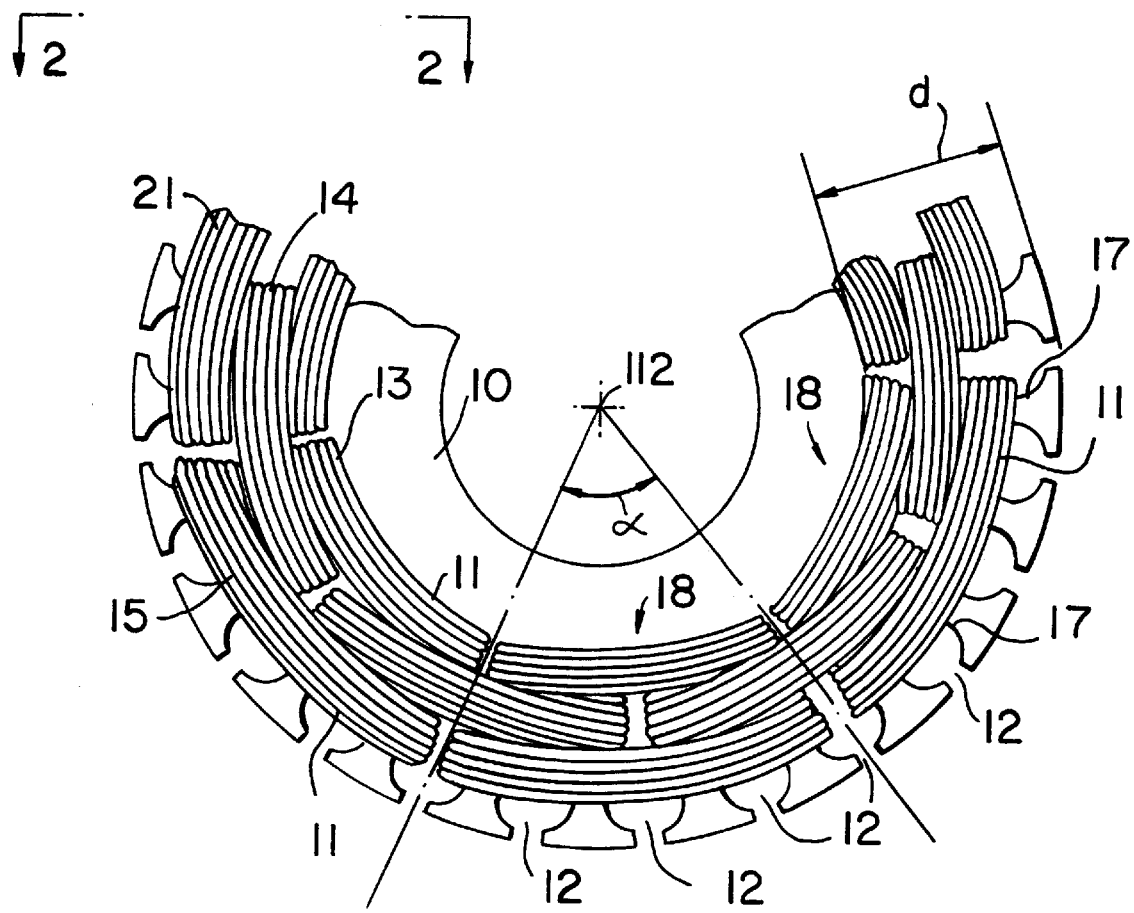
FIG. 1 is a partial front end view of an electric motor armature showing coils wound in slots.

An armature core 10 for use in an electric motor is shown in FIG. 1. (To avoid over-complicating the drawing, the entire core 10 is not shown in FIG. 1.) Core 10 has a number of coils 11 of wire 21. Each coil 11 spans two respective slots 12 in core 10. Adjacent coils 11 form circumferential coil layers 13, 14, and 15 at different radial distances from the axial center 112 of core 10. Coil layer 13 forms the innermost layer, coil layer 14 forms an intermediate layer, and coil layer 15 forms an external layer.

Slots 12 have depth d, which is considerable. In addition, the pairs of slots 12 into which coil turns of wire 21 are laid are separated by a small angular distance $\alpha$ from each other. This small angular separation causes the sides 17 of slots 12 to be nearly parallel to each other. Because sides 17 are nearly parallel, there is a tendency for wire 21 to climb sides 17, which could hinder the regular and orderly placement of the various layers of coils 11 and could leave bottom area 18 without as many coil turns as desired.

Figure 2:
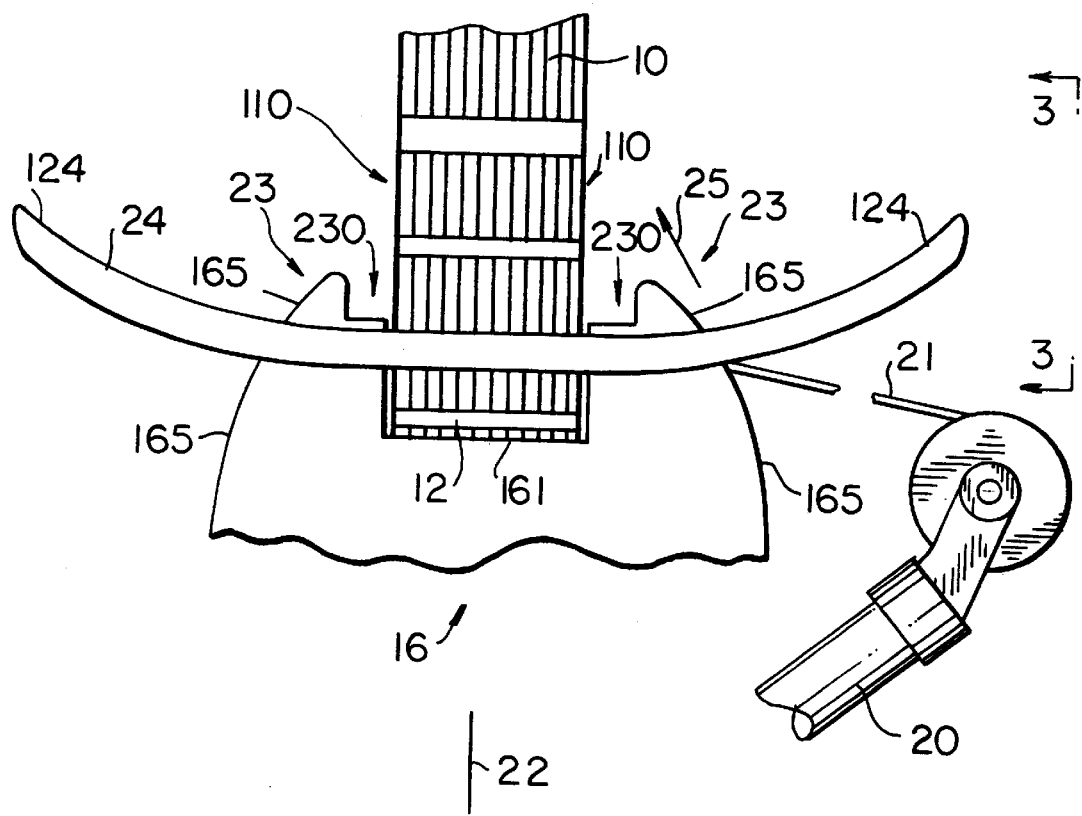
FIG. 2 is a partial view taken from direction 2—2 of FIG. 1 showing the armature of FIG. 1 in a winding machine in accordance with the present invention.

In accordance with the present invention, a wire guide 16 is provided that guides wire 21 into slots 12 while preventing wire 21 from climbing up sides 17 toward the openings of slots 12, as shown in FIG. 2. Wire guide 16 has smooth outer guide surfaces 165 that deposit wire 21 deeply in slots 12. In addition, wire guide 16 has coil retention notches 230. Coil retention notches 230 prevent wire 21 from climbing walls 17.

Figure 3:
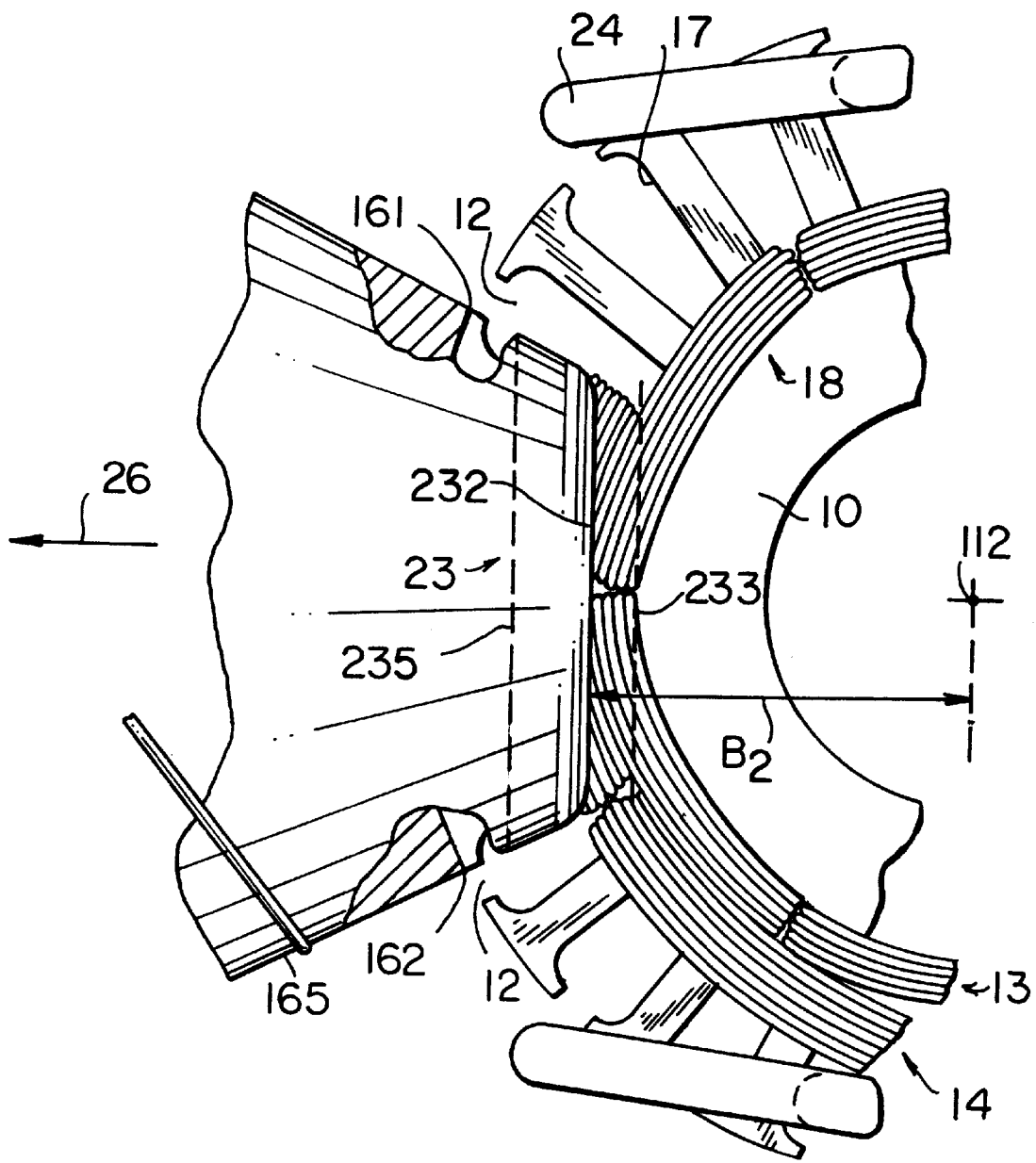
FIG. 3 is a partial view of the armature of FIG. 2 taken from direction 3—3 of FIG. 2.

As shown in FIGS. 2 and 3, coils 11 can be wound by positioning core 10 so that the openings of slots 12 where wire 21 must be wound are in alignment with longitudinally extending edges 161 and 162 of wire guide 16. In FIG. 2, only one opening can be seen aligned with top edge 161. The other slot opening is aligned with bottom edge 162, as shown in FIG. 3.

Each coil 11 of core 10 is formed by rotating flyer 20 around axis 22 (FIG. 2) for a predetermined number of turns with a starting end of wire 21 fixed to a terminal post (not shown). During the rotation of flyer 20, the coil turns forming coils 11 are laid in the slots 12 that have openings aligned with edges 161 and 162. The rotation of flyer 20 also causes coil turns to be placed across front faces 110 of core 10, outside of slots 12.

During winding of wire 21 by flyer 20, edges 161 and 162 of wire guide 16 act as a running surface for wire 21. Edges 161 and 162 maintain wire 21 aligned with the openings in slots 12, so that wire 21 can be successfully laid in slots 12 by flyer 20. Portions 23 on winding guide 16 and guide beam 24 assist in laying the coil turns formed by the wire 21 leaving flyer 20. Portions 23, which are placed adjacent to front faces 110 of core 10, have outer guide surfaces 165, which provide running surfaces for guide wire 21 leaving rotating flyer 20 during winding. Guide surfaces 165 act as smooth running surfaces for wire 21 when flyer 20 has completed a sufficient arc of rotation to make wire 21 span front faces 110 of core 10. Guide surfaces 165 guide wire 21 deeply into slots 12. Coil retention notches 230 prevent wire 21 that has been laid into slots 12 from climbing up sides 17 of slots 12 as coils 11 are wound.

Guide beams 24 also act as guide surfaces for wire 21 leaving flyer 20 during winding of coils 11, maintaining wire 21 aligned with slot openings 12. In particular, curved portions 124 of guide beams 24 deflect wire 21 towards guide surfaces 165 of wire guide 16. Without curved portions 124 of guide beam 24, wire 21 would fall well beyond surface 165 and towards the center of core 10. Arrow 25 in FIG. 2 shows the area where wire 21 would fall as flyer 20 rotates, if curved portions 124 were not used.

Figure 4:
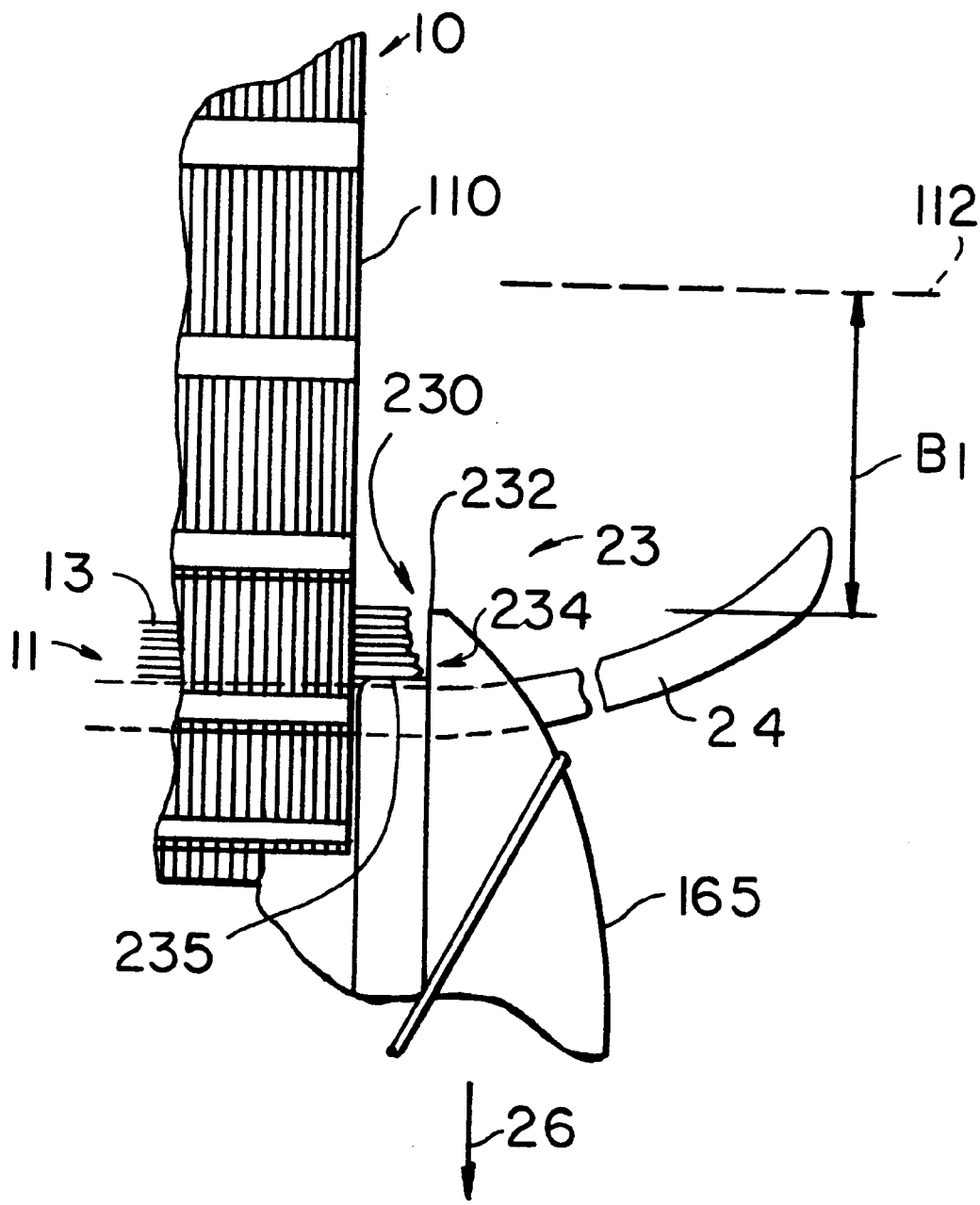
FIGS. 4–6 are partial views of the armature and winding machine of FIGS. 1–3 showing the relative position of the winding guide and armature in accordance with the present invention.
Figure 5:
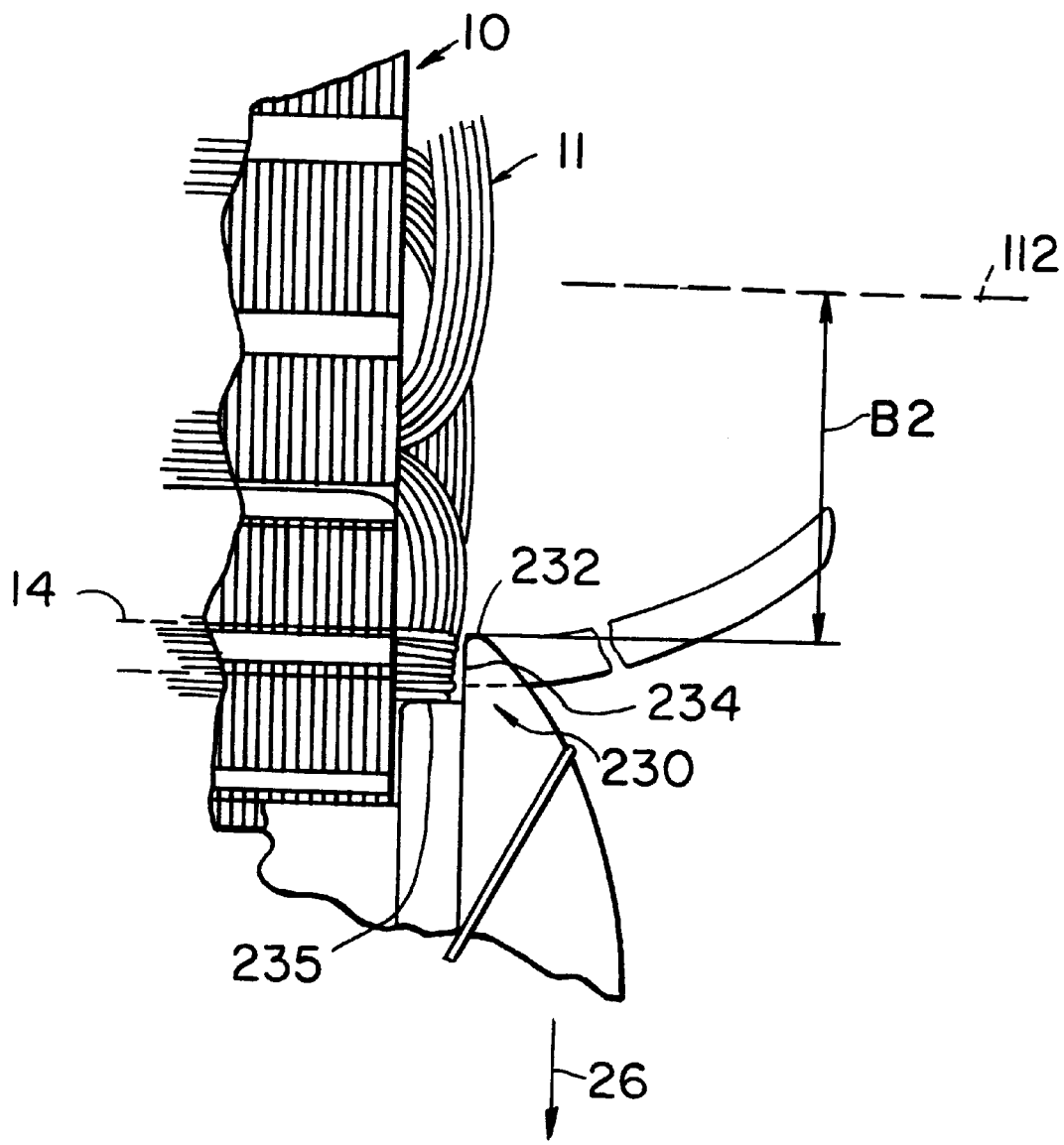
Figure 6:
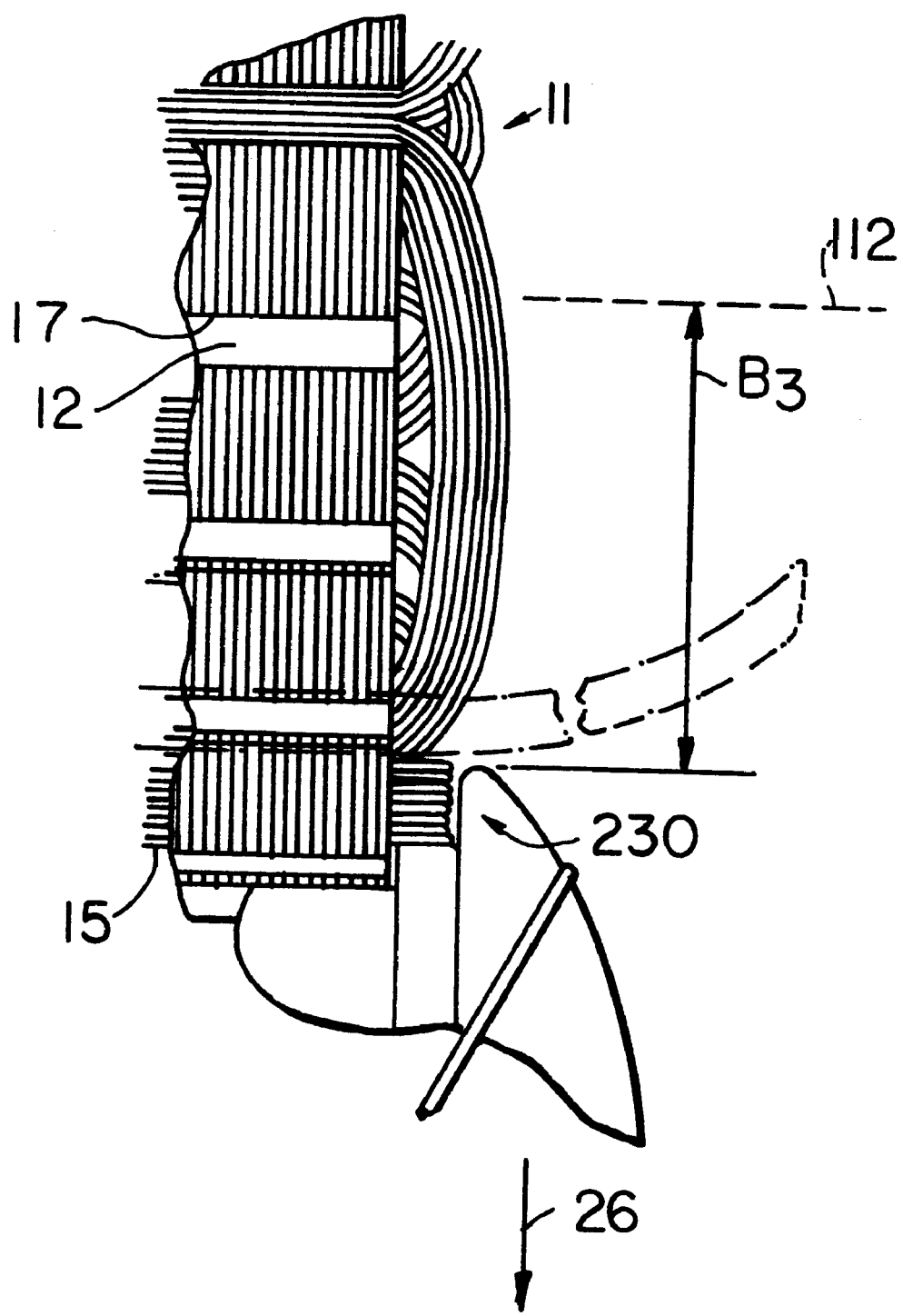

FIGS. 3, 4, 5 and 6 show how guide 16 guides wire 21 into slots 12 while preventing wire 21 from climbing sides 17. FIGS. 4, 5 and 6 are partial views similar to the view of FIG. 2, each showing different stages of the coil winding process. Only half of guide 16 is shown in FIGS. 4, 5, and 6. For example, only one coil retention notch 230 is shown. However, coils 11 are wound using two coil retention notches 230, one at each end of core 10, as shown in FIG. 2.

In FIG. 4, portion 23 of guide 16 is positioned adjacent to face 110 of core 10 at distance B1 from core center axis 112 as winding begins in order to form inner coil layer 13. Front edge 232 of portion 23 is a vertical edge, as shown in FIG. 3. For winding inner coil layer 13, edge 232 is positioned adjacent to the bottom of slots 12. The position occupied by edge 232 when winding inner coil layer 13 is given by line 233 in FIG. 3.

As flyer 20 rotates to form the portions of the coil turns that span front faces 110 of core 10, surface 165 maintains running wire 21 in alignment with the openings of slots 12, and, immediately afterwards, edge 232 of surface 165 makes wire 21 run practically to the bottom of slots 12, where wire 21 is seated. Edge 232 of surface 165 guides wire 21 during the rotation of flyer 20, so that the turns of coils 11 correctly span front faces 110 of core 10.

In addition, part of portion 23 forms coil retention notch 230. Coil retention notch 230 has side wall 234 and back wall 235. Side wall 234 is parallel to front face 110 and is perpendicular to center axis 112. Back wall 235 is perpendicular to side wall 234 and is parallel to center axis 112. Back wall 235 prevents the wire turns that have been laid in slots 12 from climbing up sides 17 towards the openings of slots 12. Back wall 235 is spaced approximately one coil thickness away from edge 232 to allow coil retention notch 230 to accommodate coils 11 as they are wound onto core 10. Side wall 234 is laterally spaced from front faces 110, which allows the coil turns of coils 11 to extend longitudinally (i.e. along longitudinal center axis 112) from front faces 110.

After a coil 11 has been completely wound in a pair of slots 12 aligned with edges 161, 162 and portions 23, core 10 is rotated around center axis 112 by conventional equipment to successively align additional pairs of slots 12, so that the entire inner coil layer 13 can be formed. Suitable wire termination operations can be performed between the winding of successive coils 11 on pairs of slots 12 to connect wire 21 to terminal posts (not shown) using conventional equipment.

Once inner coil layer 13 has been formed, portion 23 is placed at distance B2 from center axis 112 of core 10 to form intermediate coil layer 14, as shown in FIGS. 3 and 5. In forming intermediate coil layer 14, edge 232 of surface 165 is positioned adjacent to the outer turns of the coils 11 that form inner coil layer 13. The innermost portion of surface 165 therefore lays wire 21 directly above the outer turns of inner coil layer 13. Side wall 234 and back wall 235 of coil retention notch 230 prevent the turns of intermediate coil layer 14 from climbing up sides 17 towards the openings of slots 12.

When external coil layer 15 is wound, portion 23 is placed at distance B3 from center axis 112, as shown in FIG. 6. Edge 232 of surface 165 is adjacent to the outermost turns of intermediate coil layer 14, so that wire 21 running along surface 165 is laid directly above the outer turns of the coils in intermediate coil layer 14. Back wall 235 of coil retention notch 230 prevents wire turns from external coil layer 15 from climbing radially away from center axis 112 along sides 17 toward the openings of slots 12.

Placement of guide 16 and portion 23 at distances B1, B2, and B3 is preferably accomplished using a standard linear positioner (not shown). Portion 23 is moved in direction 26 after winding each coil layer. Alternatively, three different guides 16 can be used, each of which is shaped to provide a different lateral offset between portion 23 and center axis 112. A first guide 16 has portion 23 positioned at distance B1 to wind inner coil layer 13, as shown in FIG. 4. A second guide 16 has portion 23 positioned at distance B2 to wind intermediate coil layer 14, as shown in FIG. 5. A third guide 16 has portion 23 positioned at distance B3 to wind external coil layer 15, as shown in FIG. 6. A rotating turret or other suitable mechanism can be used to successively position each guide in place.

Although the winding guide of the present invention has been illustrated as guiding wire onto an armature core, similar winding guide structures can be used to wind wire onto the ferromagnetic cores of other dynamo-electric machine parts, such as stators.

The foregoing is merely illustrative of the principles of this invention and various modifications can be made by those skilled in the art without departing from the scope and spirit of the invention.

What is claimed is:

1. A wire winding guide for use in a wire winding machine having a rotating flyer that dispenses wire for winding into slots of a ferromagnetic core of a dynamo-electric machine part to form wire coils, the slots having sides that extend radially outward from a central longitudinal axis of the core, radially outermost portions away from the central longitudinal axis of the core, bottoms that extend longitudinally along said core, and slot openings defined by the radially outermost portions of the sides, the wire winding guide comprising:

a pair of outer guide surfaces that provide smooth running surfaces and guide the wire deeply into the slots to form layers of the wire coils, wherein the pair of outer guide surfaces are repositionable to different fixed radial distances with respect to the core as successive layers of the wire coils are formed; and a pair of coil retention notches each having a back wall that prevents the wire from climbing the sides of the slots as the wire is wound into the slots by the flyer, wherein the back walls of the coil retention notches are repositionable to different fixed distances with respect to the core during winding of the coils.

2. The wire winding guide defined in claim 1 wherein the core has longitudinally spaced front faces, the wire winding guide further comprising a side wall for each coil retention notch that is longitudinally spaced from a respective one of the front faces to accommodate the accumulation of wire in a direction longitudinally away from the front faces as the coils are formed.

3. The wire winding guide defined in claim 1 further comprising top and bottom guide surfaces having edges extending longitudinally along the slots of the core, the top and bottom guide surfaces guiding wire into the slots between the front faces of the core.

4. The wire winding guide defined in claim 1 wherein the outer guide surfaces have leading guide edges that are placed adjacent to the bottoms of the slots when a first layer of the coils is wound into the slots by the flyer.

5. The wire winding guide defined in claim 4 wherein the back wall of each coil retention notch is spaced from the leading guide edge sufficiently to allow the coil retention notch to accommodate the coil that is being wound.

6. The wire winding guide defined in claim 4 wherein the leading guide edges are positioned to guide the wire directly above outer coil turns of wire in a previously wound coil layer.

7. The wire winding guide defined in claim 1 further comprising a pair of guide beams for assisting in placing the wire into the slots by deflecting the wire as the wire is wound to form coils.

8. A method for using a wire winding guide to guide wire from a rotating flyer dispensing the wire into slots of a ferromagnetic core of a dynamo-electric machine part to form wire coils, the slots having sides that extend radially outward from a central longitudinal axis of the core, radially outermost portions away from the central longitudinal axis of the core, bottoms that extend longitudinally along said core, and slot openings defined by the radially outermost portions of said sides, the method comprising the steps of:

guiding the wire along a pair of outer guide surfaces on the winding guide and deeply into the slots to form layers of the wire coils;

repositioning the pair of outer guide surfaces to different fixed radial distances with respect to the core as successive layers of the wire coils are formed;

preventing the wire from climbing the sides of the slots with back walls of a pair of coil retention notches as the wire is wound into the slots by the flyer; and repositioning the back walls of the coil retention notches to different fixed radial distances with respect to the core during winding of the coils.

9. The method defined in claim 8 wherein each coil retention notch has a side wall and the core has longitudinally spaced front faces, the method further comprising the step of longitudinally spacing each side wall from a respective one of the front faces to accommodate the accumulation of wire in a direction longitudinally away from the front faces as the coils are formed.

10. The method defined in claim 8 wherein the winding guide has top and bottom guide surfaces with edges extending longitudinally along the slots of the core, the method further comprising the step of guiding wire into the slots with the top and bottom guide surfaces, so that the wire is wound into the slots between the front faces of the core.

11. The method defined in claim 8 wherein the outer guide surfaces of the winding guide have leading guide edges, the method further comprising the step of placing the leading guide edges adjacent to the bottom of the slots when coils are wound into the slots by the flyer.

12. The method defined in claim 11 further comprising the step of positioning the leading guide edges to guide the wire directly above outer coil turns of wire in a previously wound coil layer.

13. The method defined in claim 11 further comprising the step of positioning the back wall of each coil retention notch to allow the coil retention notch to accommodate the coil that is being wound.

14. The method defined in claim 8 further comprising the step of deflecting the wire with a pair of guide beams to place the wire into the slots as the wire is wound to form the coils.

* * * * *